United States Patent [19]
Goldner et al.

[11] Patent Number: 6,134,185
[45] Date of Patent: Oct. 17, 2000

[54] FIBER OPTIC COMPONENT ASSEMBLY MODULE

[75] Inventors: Eric Lee Goldner, Valencia, Calif.; Gary Thomas Griffin, Millican, Tex.

[73] Assignee: Litton Systems, Inc., Woodland Hills, Calif.

[21] Appl. No.: 09/362,786

[22] Filed: Jul. 28, 1999

[51] Int. Cl.[7] ...................................................... H04R 1/44
[52] U.S. Cl. ........................... 367/149; 367/173; 367/188
[58] Field of Search ..................................... 367/140, 154, 367/149, 153, 141, 173, 188; 174/50

[56] References Cited

U.S. PATENT DOCUMENTS

| | | |
|---|---|---|
| 4,648,083 | 3/1987 | Giallorenzi .............................. 367/149 |
| 5,155,548 | 10/1992 | Danver et al. . |
| 5,345,522 | 9/1994 | Vali et al. . |
| 5,668,779 | 9/1997 | Dandridge et al. . |

*Primary Examiner*—Ian J. Lobo
*Attorney, Agent, or Firm*—Lynn & Lynn

[57] ABSTRACT

An assembly module provides well-organized optical fiber component attachment features and convenient fiber routing areas for assembling and containing a fiber optic device such a telemetry module. The module comprises a first substrate having a first side and a second side. The first side includes a plurality of sidewalls and a recessed floor surface bounded by the sidewalls. Some of the sidewalls have a cavities formed therein. A plurality of channels extend from the ends of the cavities. A plurality of projections extend from the sidewalls over selected portions of the floor surface such that a lower edge of each projection is spaced apart from the floor surface. Optical fiber components (couplers, splices, etc.) may be mounted in the cavities, and optical fibers are routed to and from the optical fiber components on regions between the sidewalls and through the channels. The optical fibers are placed in the spaces between the projections and the floor surface to retain the optical fibers in selected positions. The assembly module provides for preassembled, pretested, mass produced, fiber optic coupler and excess fiber subassemblies and reduces the potential for component and fiber damage during manufacturing and allows for, but reduces the need for, the potential rework and repair associated with errors and failures during array assembly, thereby reducing manufacturing cost.

16 Claims, 3 Drawing Sheets

FIBER OPTIC COMPONENT ASSEMBLY MODULE

BACKGROUND OF THE INVENTION

This invention relates generally to assembling fiber optic systems. This invention relates particularly to a module for holding fiber optic components in sensor systems such as hydrophone arrays.

Current state of the art in either towed or fixed hydrophone array assembly employs tedious and precision manual labor to integrate fiber optic couplers and/or excess fiber lengths and/or optical fiber splices during the assembly of optical fiber sensor arrays. These elements are usually assembled, packaged and inspected with commensurate hand operations required. The primary disadvantages of this approach are the potential damage and/or loss of components and fiber due to physical breakage during handling, and the high labor costs associated with installing the couplers and/or excess fiber lengths.

Handling and arranging optical fiber is often very tedious because of the tendency of optical fiber to assume a straight line configuration due to its stiffness. This causes loops of fiber to tend to expand outward. The outer edges of planar loops also tend to twist and rise up away from a substrate to which it is to be mounted, thereby requiring multiple bonding operations, which may inhibit or preclude rework or repair.

SUMMARY OF THE INVENTION

The present invention overcomes these and other problems by providing well-organized optical fiber component attachment features and convenient fiber routing areas.

This invention extends the present manufacturing state of the art by allowing for the use of preasembled, pretested, mass produced, fiber optic coupler(s) and excess fiber(s) subassemblies. The compact fiber optic assembly module also allows integration of higher level assemblies, hence providing for a more modular assembly with improved testability. This device reduces the potential for component and fiber damage during manufacturing and allows for, but reduces the need for, the potential rework and repair associated with failures during array assembly or testing, thereby reducing manufacturing cost.

A module according to the present invention for assembling and containing a fiber optic device comprises a first substrate having a first side and a second side. The first side includes a plurality of sidewalls and a recessed floor surface bounded by the sidewalls. Some of the sidewalls have cavities formed therein. A plurality of channels extend from the ends of the cavities; and a plurality of projections extends from the sidewalls over selected portions of the floor surface such that a lower edge of each projection is spaced apart from the floor surface. Optical fiber components (couplers, splices, etc.) may be mounted in the cavities, and optical fibers are routed to and from the optical fiber components through the channels. The optical fibers are placed in the spaces between the projections and the floor surface to retain the optical fibers in selected positions.

The invention also includes an arrangement where a pair of the substrates are mounted to opposite ends of a plurality of spools that are suitable for having optical fiber coils formed thereon. The optical fiber components and coils may be used to form interferometric sensors, delay lines and other components used in forming a fiber optic hydrophone array.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 8 is a perspective view of the fiber optic component assembly module in a clam shell protective housing.

DETAILED DESCRIPTION OF THE INVENTION

Figure 1:
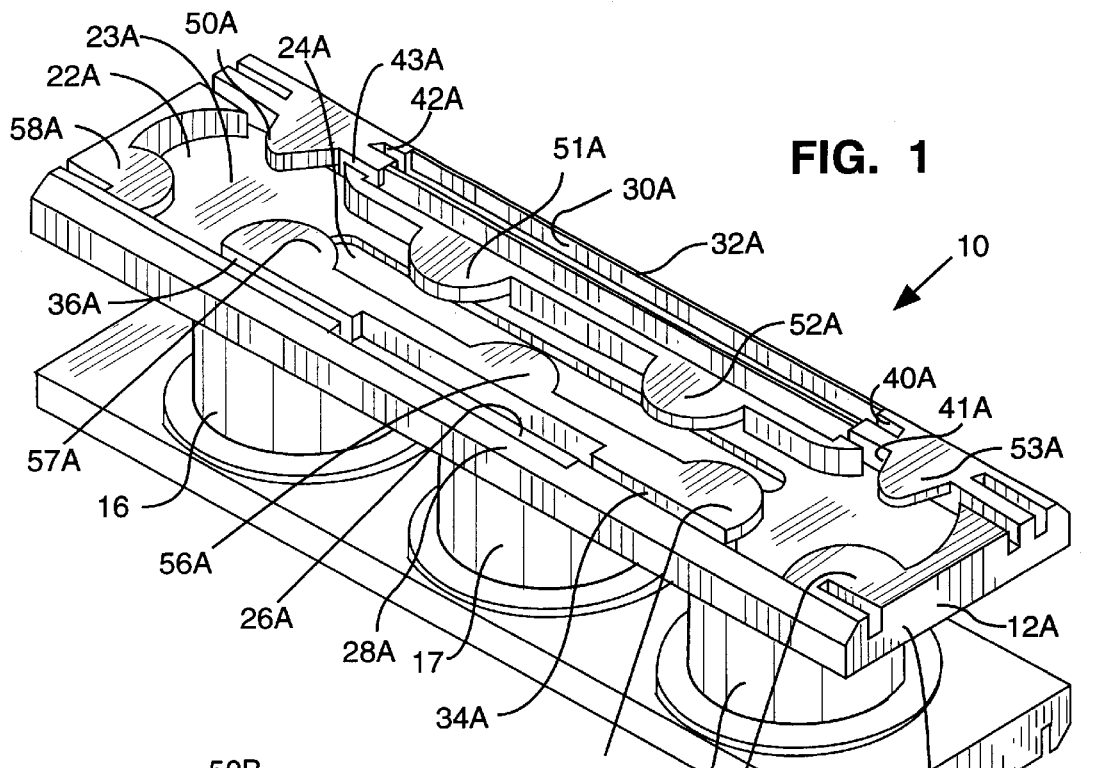
FIG. 1 is a perspective view of a fiber optic assembly module according to the present invention.
Figure 2:
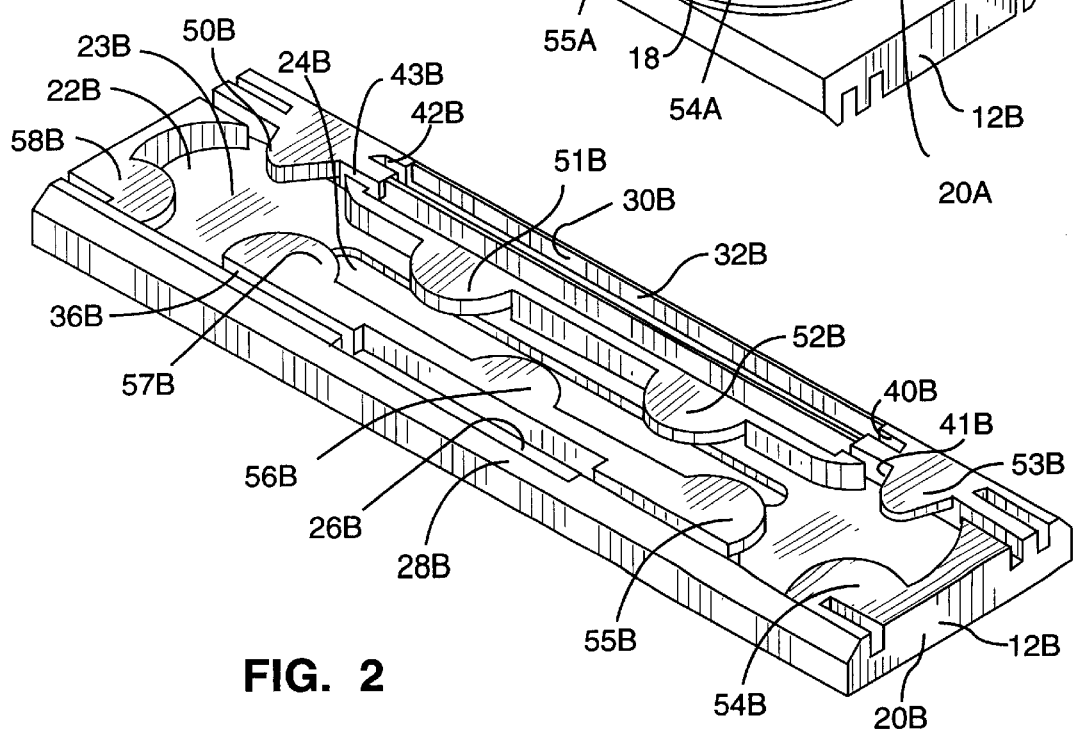
FIG. 2 is a reverse angle perspective view of the lower side of the fiber optic assembly module of FIG. 1.

As shown in FIGS. 1 and 2, a fiber optic assembly module 10 according to the present invention includes an upper retainer 12A and a lower retainer 12B. The retainers 12A and 12B are mounted to opposite ends of a plurality of spools 16–18. The retainers 12A and 12B preferably are identical. Therefore, only the retainer 12 is described in detail. Components of the retainers 12A and 12B are designated with a number followed by the letter "A" and "B," respectively. It is to be understood that for each component described in the retainer 12A, there is a corresponding component in the retainer 12B.

The fiber optic assembly module 10 may be formed from a number of materials (e.g., metals, plastics, elastomers, foam rubbers, etc.) using one of a number of different manufacturing methods (e.g., machining, injection molding, casting). Each of the retainers 12A and 12B as illustrated in FIGS. 1–4 is suitable for holding up to two fiber optic couplers that may be included in fiber optic devices such as fiber optic interferometric sensors or as part of fiber optic telemetry networks. Couplers suitable for use with the present invention include 2×2 fused biconical tapered couplers that are commercially available from manufacturers such as Gould Electronics, Inc.

The retainer 12A may be formed from an elongated, thin, generally rectangular substrate 20A. A central planar floor surface 22A has an elongated passage 24A extending therethrough. A first cavity 26A is formed adjacent to edge 28A, and a second cavity 30A is formed adjacent to the opposite edge 32A. The cavities 26A and 30A may be of any convenient shape, such as generally semicylindrical or rectangular. The cavities may be the same shape as and provide a housing location for the couplers, which typically have circular cross-section cylindrical housings.

Fiber routing channels 34A and 36A extend from the ends of the cavity 26A. Fiber routing channels 40A–43A also extend from the ends of the semicylindrical cavity 30A. A plurality of projections 50A–58A extend from the sides of the substrate over portions of the floor surface 22A. These projections 50A–58A are spaced apart from the floor surface 22A so that optical fibers may be retained between the projections and the floor surface as shown in FIGS. 1, 2 and 4.

Figure 3:
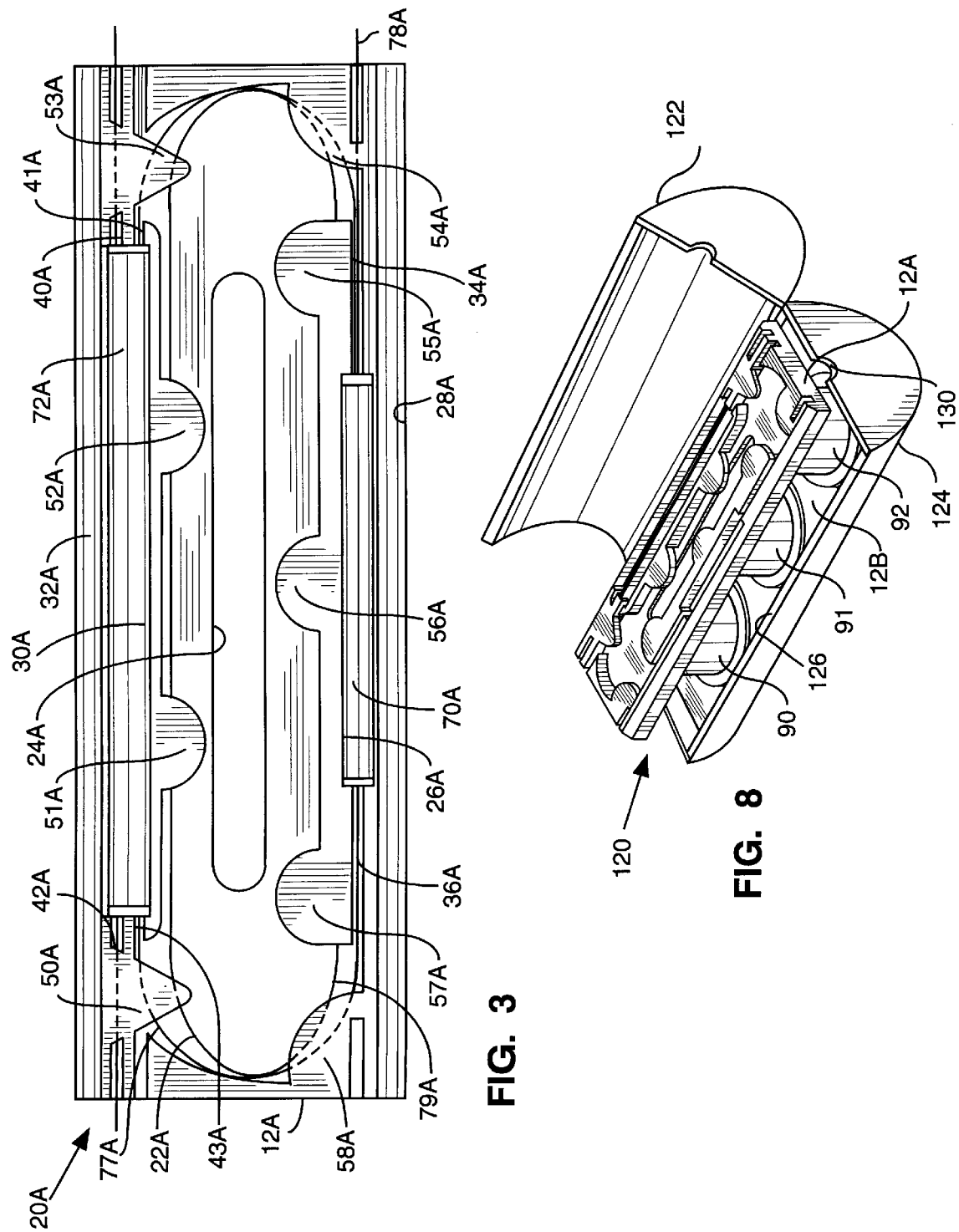
FIG. 3 is a top plan view of the fiber optic assembly module of FIG. 1 showing fiber optic components mounted therein.
Figure 4:
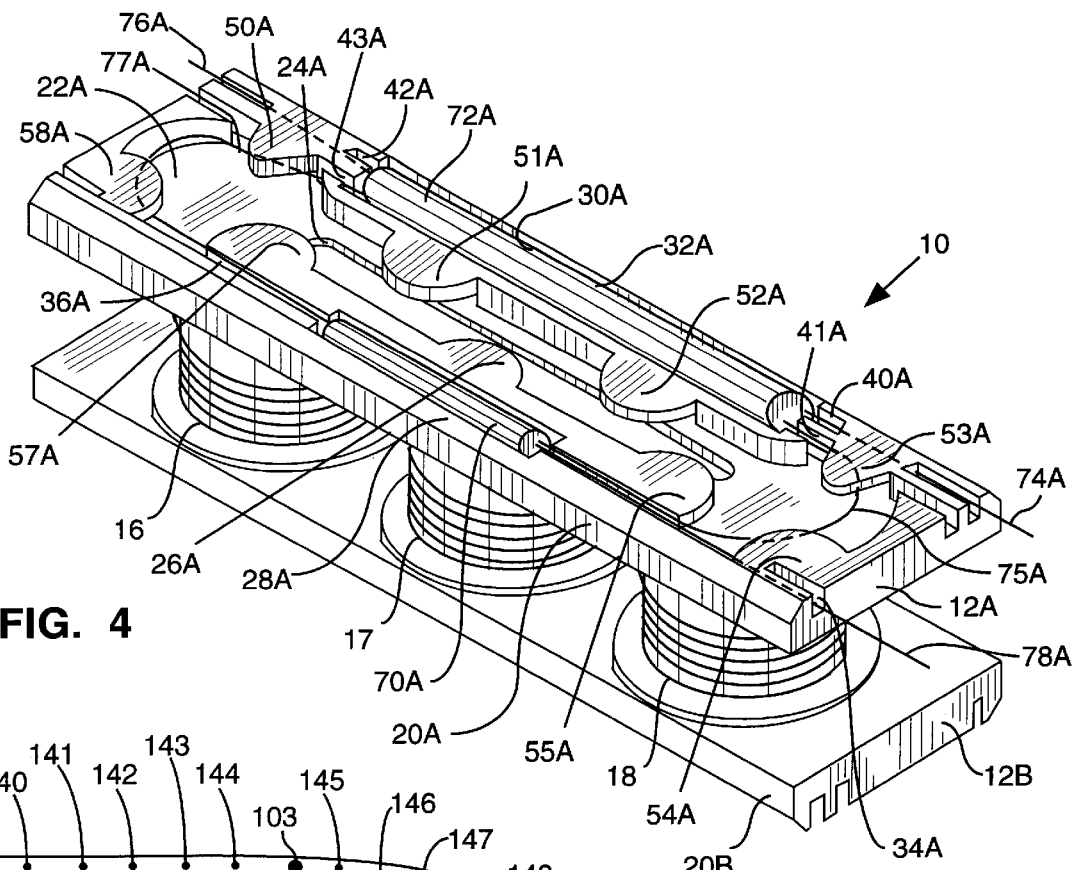
FIG. 4 shows the apparatus of FIG. 1 with fiber optic components mounted to the module.

As shown in FIGS. 3 and 4, a fiber optic coupler that is pre-fabricated and contained in a cylindrical coupler package 72A may be mounted in the cavity 30A. A fusion splice may be installed in a container 70A, which is mounted in the cavity 26A. Potting of couplers and splices may be accomplished prior to or after installation within the module 10 (for pressure isolation, for example). As shown in the exemplary embodiment, optical fibers 74A–77A extend from the ends of the coupler package 72A and pass through the fiber routing channels 40A–43A, respectively. Optical fibers 78A–79A extend from the container 70A and pass through the fiber routing channels 34A and 36A. The fibers 75A, 77A, 79A are retained near the floor surface 22A by the projections 50A–58A.

The retainer 12B may be used to mount a coupler container 72B in the cavity 30B and a splice container 70B in the cavity 26B. Some of the fiber leads extending from the couplers may extend through the central passage 24A or 24B for connection to the optical fiber coils 90–92 wound onto the spools 16–17, respectively. The fiber coils 90–92 are used for applications requiring time division multiplexing in which optical delay lines are used for signal timing. The fiber leads may also be connected together and with fiber optic leads from an optical fiber-wound hydrophone mandrel to form either a Mach-Zehnder or Michelson interferometer in a manner well-known in the art to form an interferometric sensor as disclosed in U.S. Pat. Nos. 5,668,779 and 5,155, 548, the disclosures of which are incorporated by reference into the present disclosure. Some of the leads may also extend through the fiber routing channels for connection to an optical telemetry fiber so that an array of interferometric sensors may be formed that may be interrogated over large distances such as 1 to 100 km.

The recessed central cavity 23A and the projections 50A–58A allow for rapid, continuous and removable routing of individual fibers and efficient storage of fiber and fusion splices necessary to connect hydrophones, couplers and fibers. Excess lengths of optical fiber must also be accommodated. This can be achieved by winding the required length(s) of fiber on one or more of the spools 16–18. Spools 16–18 may be made of a variety of plastics and metals, and they may be fabricated by a number of methods. In the preferred embodiment, injection molded polycarbonate spools are used. Machining and stamping techniques may also be used to form the spools 16–18 of other materials, such as aluminum. Optical fiber may be wound on the spools 16–18 off-line using automated machinery. The spools are subsequently sandwiched between the substrates 20A and 20B and maybe attached to the substrate by bonding or other suitable means.

Some applications may require installation of the fiber optic assembly module 12 within a housing that may be either rigid or flexible. The housing may be made in a variety of configurations from various materials using one of a number of fabrication methods. For example, square or cylindrical housing shapes may be used. Snap-together or hinged clam-shell closure mechanisms may be used to enclose the module 12. The housing may be made from plastic, metal or other suitable material and may be formed, machined or injection molded. Some applications may require intermediate attachment of the module assembly housing to one or more metal or synthetic strength members within an array of fiber optic hydrophones. Such applications may include, but are not limited to, fixed cable arrays, such as ocean bottom cables.

Figure 5:
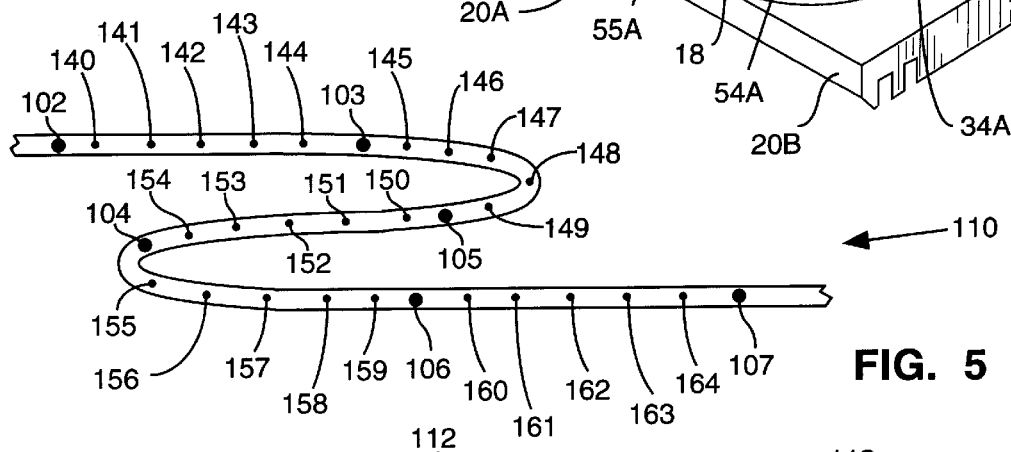
FIG. 5 illustrates a fiber optic hydrophone array distributed inside a tubular protective housing.

FIG. 5 illustrates a plurality of assembly modules 102–107 according to FIGS. 1–4 arranged inside a protective shell 110 that preferably is formed as a flexible tube or hose. The assembly modules 102–107 may be arranged with optical hydrophones 140–164 to form a hydrophone array as disclosed in U.S. Pat. Nos. 5,515,548 and 5,345,522, the disclosures of which are incorporated by reference into the present disclosure. The hydrophone array may include one or more telemetry modules for combining and/or directing signals output from the hydrophones to signal processing electronics (not shown). These telemetry modules may be packaged within the assembly module 10.

Figure 6:
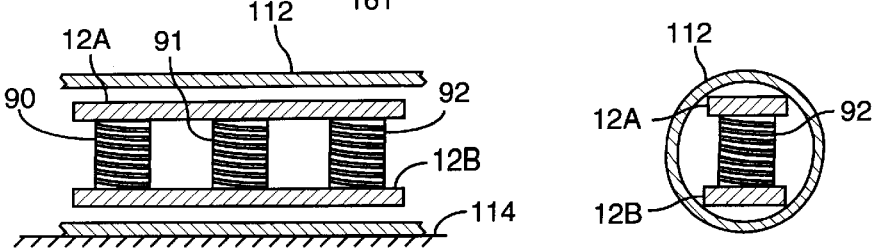
FIG. 6 is an end cross sectional view of a fiber optic assembly module according to the present invention inside the protective housing.
Figure 7:
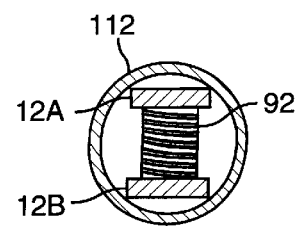
FIG. 7 is an end cross sectional view of the apparatus of FIG. 6.

As shown in FIGS. 6 and 7, the hose has a wall 112 of thickness suitable for protecting the hydrophones and the assembly modules 102–107 and fiber optic components mounted thereon from environmental hazards that could cause damage to the components or that could render the components inoperable.

FIG. 8 is a perspective view of an assembly module according to the present invention inside a clam shell type protective housing 120. The protective housing 120 includes an upper half 122 and a lower half 124 that preferably are formed as thin-walled semicylinders. The upper half 122 and lower half 124 preferably are hinged together along two adjacent sides. The inner diameter of the protective housing 120 is configured to hold the assembly module 10 securely. The protective housing 120 has a side wall 126 of thickness adequate to protect the assembly module 10 and fiber optic components (not shown in FIG. 8) mounted thereon from being damaged during assembly or in normal usage. At each end of the protective housing 120 there is an opening 130 to allow connecting cables (not shown) to extend from the housing 120 to other apparatus such as hydrophones (not shown).

This invention is a novel component for the rapid and economical manufacturing of both towed and ocean bottom mounted linear fiber optic hydrophone arrays. The advantage over prior art include its compactness/reduced size, its ability to protect optical couplers and associated fiber assemblies during assembly and when deployed; the ability to store and protect additional/excess fiber lengths required for certain optic telemetry applications; and its ability to serve as an integrated subassembly which can be premanufactured and economically mass produced and tested before final array assembly.

The present invention can be economically manufactured from a variety of methods, using metals, thermoplastics, composites (e.g. epoxy/glass), elastomers, or foam rubber materials. Subsequent installation of optical fibers and couplers is facilitated by the molded or machined cavities and channels which mechanically locate and protect the optic components. Long fiber lengths (used for timing delay lines, etc.) can be "prewound" onto each spool as required prior to final assembly of the module. The resulting device is a simple, economical, light weight package which can be utilized for a wide range of optical fiber hydrophone applications.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing descriptions define the scope of the invention. All modifications to the embodiments described herein that come within the meaning and range of equivalence of the claims are embraced within the scope of the invention.

What is claimed is:

1. A module for assembling and containing a fiber optic device, comprising:
    a first substrate having a first side and a second side, the first side including a plurality of sidewalls and a recessed floor surface bounded by the sidewalls;
    a selected sidewall having a cavity formed therein, the sidewall further including a plurality of channels extending from the ends of the cavity; and
    a plurality of projections extending from the sidewalls over selected portions of the floor surface such that a lower edge of each projection is spaced apart from the floor surface.

2. The module of claim 1, further comprising a second selected sidewall having a second cavity formed therein.

3. The module of claim 2 wherein the floor surface includes a passage therethrough.

4. The module of claim 2, further including:
    a plurality of spools each having one end thereof mounted to the lower side of the substrate; and
    a second substrate that is functionally similar to the first substrate and arranged so that its lower side is mounted to the spools so that the spools are retained between the substrates.

5. The module of claim 3 wherein a plurality of fiber optic components are mounted in the cavities in the substrates.

6. The module of claim 5 wherein the plurality of fiber optic components are configured to form an interferometric sensor.

7. The module of claim 3 wherein a plurality of fiber optic components are mounted in the cavities in the substrates, the fiber optic components being configured to form a portion of a fiber optic multiplexing network.

8. The module of claim 4, further comprising a housing configured to retain the first and second substrates therein.

9. A fiber optic hydrophone array, comprising:
    a protective shell,
    a plurality of fiber optic hydrophones arranged in series within the protective shell, each fiber optic hydrophone including a fiber optic component assembly module, each module including:
        a first substrate having a first side and a second side, the first side including a plurality of sidewalls and a recessed floor surface bounded by the sidewalls;
        a selected sidewall having a cavity formed therein, the sidewall further including a plurality of channels extending from the ends of the cavity; and
        a plurality of projections extending from the sidewalls over selected portions of the floor surface such that a lower edge of each projection is spaced apart from the floor surface.

10. The apparatus of claim 9, further comprising a second selected sidewall having a second cavity formed therein.

11. The apparatus of claim 9 wherein the floor surface includes an passage therethrough.

12. The apparatus of claim 9, further including:
    a plurality of spools each having one end thereof mounted to the lower side of the first substrate; and
    a second substrate that is substantially identical to the first substrate and arranged so that its lower side is mounted to the spools so that the spools are retained between the substrates.

13. The module of claim 9 wherein a plurality of fiber optic couplers and optical fibers are mounted in the cavities in the substrates.

14. The module of claim 13 wherein the plurality of fiber optic couplers and optical fibers are arranged to form an interferometer.

15. The module of claim 9 wherein a plurality of fiber optic components are mounted in the cavities in the substrates, the fiber optic components being configured to form an interferometric sensor.

16. The module of claim 9 wherein a plurality of fiber optic components are mounted in the cavities in the substrates, the fiber optic components being configured to form a portion of a fiber optic multiplexing network.

* * * * *

UNITED STATES PATENT AND TRADEMARK OFFICE
CERTIFICATE OF CORRECTION

PATENT NO. : 6,134,185
DATED : October 17, 2000
INVENTOR(S) : Eric Lee Goldner & Gary Thomas Griffin It is certified that error appears in the above-identified patent and that said Letters Patent is hereby corrected as shown below:

IN THE SPECIFICATION
After the title, please insert the following:

-- Statement of Government Rights in Invention This invention was made with support under Contract N00014-95-2-0015 awarded by the U.S. Department of the Navy, Naval Research and Development. The Government of the United States of America has certain rights in this invention. --

Signed and Sealed this

Twenty-fifth Day of September, 2001

Attest:

*Attesting Officer*

NICHOLAS P. GODICI
*Acting Director of the United States Patent and Trademark Office*